Sept. 17, 1935.  A. E. LEACH  2,014,438
BRAKE LINING MATERIAL AND METHOD OF PRODUCING SAME
Filed June 17, 1931
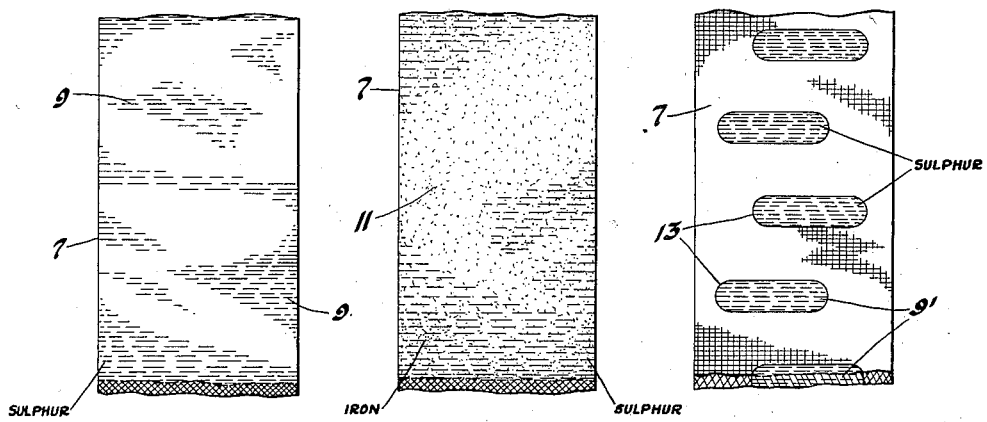
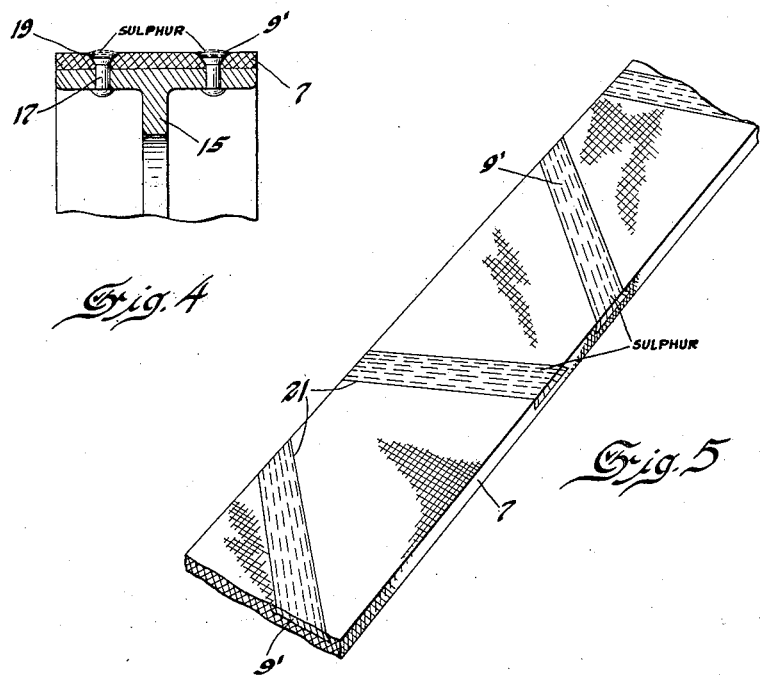
Inventor
Albert E. Leach
By Blackmore, Spencer & Huth
Attorneys Patented Sept. 17, 1935

2,014,438

UNITED STATES PATENT OFFICE 2,014,438

BRAKE LINING MATERIAL AND METHOD OF PRODUCING SAME

Albert E. Leach, Royal Oak, Mich., assignor to General Motors Corporation, Detroit, Mich., a corporation of Delaware Application June 17, 1931, Serial No. 544,938

6 Claims. (Cl. 18—48)

This invention relates to brakes and particularly to an improvement in the lining for use with brake shoes or bands. Although the invention has been developed as an improvement for use with friction brakes, it will be understood that it is useful in other relations where non-metallic linings or facings are used with metallic surfaces as, for example, in clutches.

The primary object of the invention is to avoid the scoring of the brake drum or other metallic surface with which the non-metallic friction lining is to engage.

More definitely the invention involves the discovery that brake linings having sulphur or substances containing sulphur as an ingredient added thereto, by any one of a plurality of methods, do not score the metallic surfaces.

The invention may be embodied in many ways, some of which are specifically disclosed herein.

This use of sulphur to avoid drum scoring is extremely economical and therefore economy is one of the objects of the invention.

Fig. 1 shows a plan view of a brake lining with flowers of sulphur dusted upon its surface.

Fig. 2 shows a similar view wherein sulphur mixed with finely divided iron is distributed upon the lining.

Fig. 3 shows a plan view of a brake lining having slots therein filled with sulphur.

Fig. 4 is a transverse section through a brake shoe with its lining, the spaces above the rivets which secure the lining to the shoe serving as depressions for carrying the sulphur.

Fig. 5 is a perspective view of a lining showing another way of carrying the sulphur.

In Fig. 1 is shown a portion of the lining 7 upon which there has been distributed dry flowers of sulphur represented by numeral 9. Such an application of sulphur may be made by dusting the dry sulphur into the brake drum and upon the lining surface. Also capsules or pellets of sulphur may be put inside the drum and the normal bouncing around would coat the lining with the sulphur. In the case of an external band, the ease of application is obvious. When sulphur is added as a loose powder or in improperly controlled quantities, the coefficient of friction appears to be increased, and for a short period after the application the brake action is somewhat erratic. After numerous brake applications this erractic action diminishes and finally the brake operation becomes normal. The scoring of the drum produced by a lining not so treated may be completely cleared up, leaving smooth circumferential ridges in place of the torn surface produced by the untreated lining. Obviously, also, with the use of sulphur which prevents scoring lining material having a relatively high coefficient of friction may be used.

Where the sulphur is applied to new linings there will be no scoring. At the start there may be the same erratic action which soon disappears as stated above. This erratic action at the start may be due to the fact that the partly melted sulphur causes a resinous deposit on the surface of the lining. This appears to cause excessive pedal pressure when the brakes are cold. When the brakes are well warmed up, the action eases up and thereafter the non-scoring band or shoe operates without disadvantages.

It may be desirable, when the sulphur is added to the linings before curing, to add finely divided iron 11 to the sulphur. This iron will serve to prevent any possible undesired reaction with the sulphur in the curing process.

Fig. 2 shows the use of sulphur and iron.

Fig. 3 shows a piece of brake lining 7 having slots 13 cut into the lining, which slots are filled with sulphur 9'. The sulphur may be melted and poured into the slots. If preferred, sulphur in the form of paste may be inserted into the slots, grooves, or other depressions. Such a paste may be formed by mixing powdered sulphur with water. The sulphur may be inserted into the depressions under heavy pressure if desired.

In Fig. 4 there is shown a form where a brake shoe 15 is provided with a conventional lining 7. The lining is secured to the shoe by rivets 17. The countersunk holes 19 above the rivets 17 serve as the depressions in carrying the sulphur 9'.

Fig. 5 shows another form in which there are diagonal grooves 21 of dovetail cross section extending across the lining material 7. These grooves are filled with melted sulphur 9'. The excess is removed from the surface by filing. If the lining be warmed before the application of the sulphur a cementing action takes place.

The above are but a few of the many ways in which the sulphur may be applied to the non-metallic lining to secure the advantages set forth. It is intended in the following claims to secure protection on the invention of the use of sulphur with brake linings as broadly as the state of the art permits.

I claim:

1. Frictionally engaging members to resist motion, one of said members being non-metallic, said non-metallic member having depressions therein filled with sulphur.

2. That method of treating non-metallic linings to prevent scoring comprising forming depressions in said linings and filling said depressions with melted sulphur.

3. That method of treating non-metallic linings to prevent scoring comprising forming depressions in said lining and filling said depressions with sulphur under high pressure.

4. For use with a brake drum, a lining having transverse grooves, said grooves being filled with sulphur.

5. A lining for brakes or the like having uncombined sulphur localized on its frictional surface to minimize scoring.

6. A lining for brakes or the like having on its frictional surface depressions filled with uncombined sulphur.

ALBERT E. LEACH.